(12) United States Patent
Windhorst et al.

(10) Patent No.: US 7,313,915 B1
(45) Date of Patent: *Jan. 1, 2008

(54) ASSEMBLY FOR USE WITH A RETURN TO NEUTRAL MECHANISM

(75) Inventors: Scott E. Windhorst, Decatur, IL (US); Bruce E. Reid, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/680,967

(22) Filed: Mar. 1, 2007

Related U.S. Application Data (63) Continuation of application No. 11/252,836, filed on Oct. 18, 2005, now Pat. No. 7,197,873.

(51) Int. Cl.
*F16H 61/42* (2006.01)
*F01B 13/00* (2006.01)

(52) U.S. Cl. .......................... 60/487; 92/12.2
(58) Field of Classification Search .......... 60/487; 91/505; 92/12.2
See application file for complete search history.

(56) References Cited

U.S. PATENT DOCUMENTS

| | | | |
|---|---|---|---|
| 3,354,981 A | 11/1967 | Swanson et al. | |
| 3,541,878 A | 11/1970 | Haffner | |
| 3,765,258 A | 10/1973 | Jespersen | |
| 3,792,744 A | 2/1974 | Gray | |
| 3,837,235 A | 9/1974 | Peterson | |
| 4,018,104 A | 4/1977 | Bland et al. | |
| 4,111,062 A | 9/1978 | Calligan | |
| 4,167,855 A | 9/1979 | Knapp | |
| 4,352,302 A | 10/1982 | McAlife et al. | |
| 4,375,771 A | 3/1983 | Kobelt | |
| 4,438,660 A | 3/1984 | Kittle | |
| 4,600,075 A | 7/1986 | Heidner et al. | |
| 4,606,428 A | 8/1986 | Giere | |
| 4,845,949 A | 7/1989 | Shivvers et al. | |
| 4,856,368 A | 8/1989 | Fujisaki et al. | |
| 4,870,820 A | 10/1989 | Nemoto | |
| 4,899,541 A | 2/1990 | Okada et al. | |
| 4,905,472 A | 3/1990 | Okada | |
| 4,914,907 A | 4/1990 | Okada | |
| 4,934,252 A | 6/1990 | Giere | |
| 4,955,249 A | 9/1990 | Wetor | |
| 4,986,073 A | 1/1991 | Okada | |
| 5,042,252 A | 8/1991 | Havens et al. | |

(Continued)

OTHER PUBLICATIONS

Technical Information Manual for Series 40 Pumps, SPV40E, Rev. Apr. 1997.

(Continued)

*Primary Examiner*—Thomas E. Lazo
(74) *Attorney, Agent, or Firm*—Neal, Gerber & Eisenberg (57) ABSTRACT

A control assembly for use with hydraulic apparatus having a housing, a trunnion extending from the housing, a return arm and a control arm mounted on the trunnion. The control assembly is attached to the trunnion arm and includes a pair of scissor return arms biased to place the hydraulic apparatus in a neutral condition, a pair of bushings and a spacer pressed into the bushings to form the assembly.

12 Claims, 6 Drawing Sheets

U.S. PATENT DOCUMENTS

| | | |
|---|---|---|
| 5,044,478 A | 9/1991 | Kaesgen et al. |
| 5,074,195 A | 12/1991 | Ohashi et al. |
| 5,078,222 A | 1/1992 | Hauser et al. |
| 5,094,077 A | 3/1992 | Okada |
| 5,094,326 A | 3/1992 | Schemelin et al. |
| 5,136,845 A | 8/1992 | Woodley |
| 5,146,748 A | 9/1992 | Okada |
| 5,163,293 A | 11/1992 | Azuma et al. |
| 5,182,966 A | 2/1993 | von Kaler et al. |
| 5,201,692 A | 4/1993 | Johnson et al. |
| 5,289,738 A | 3/1994 | Szulczewski |
| 5,311,740 A | 5/1994 | Shiba et al. |
| 5,314,387 A | 5/1994 | Hauser et al. |
| 5,333,451 A | 8/1994 | Sakikawa et al. |
| 5,339,631 A | 8/1994 | Ohashi |
| 5,373,697 A | 12/1994 | Jolliff et al. |
| 5,383,376 A | 1/1995 | Thorman et al. |
| 5,427,216 A | 6/1995 | Hoch |
| 5,440,951 A | 8/1995 | Okada et al. |
| 5,546,752 A | 8/1996 | Horton et al. |
| 5,555,727 A | 9/1996 | Hauser et al. |
| 5,588,294 A | 12/1996 | Sakakura et al. |
| 5,622,051 A | 4/1997 | Iida et al. |
| 5,771,758 A | 6/1998 | Hauser |
| 5,794,443 A | 8/1998 | Shimizu |
| 5,819,537 A | 10/1998 | Okada et al. |
| 5,836,159 A | 11/1998 | Shimizu et al. |
| 5,842,532 A | 12/1998 | Fox et al. |
| 5,860,884 A | 1/1999 | Jolliff |
| 5,873,287 A | 2/1999 | Kawada |
| 5,887,484 A | 3/1999 | Abend et al. |
| 5,918,691 A | 7/1999 | Ishii |
| 6,010,423 A | 1/2000 | Jolliff et al. |
| 6,122,996 A | 9/2000 | Hauser et al. |
| 6,125,630 A | 10/2000 | Abend et al. |
| 6,152,247 A | 11/2000 | Sporrer et al. |
| 6,272,854 B1 | 8/2001 | Ishii et al. |
| 6,314,730 B1 | 11/2001 | Shimizu |
| 6,487,857 B1 * | 12/2002 | Poplawski et al. ............ 60/487 |
| 6,782,797 B1 | 8/2004 | Brandenburg et al. |
| 6,935,106 B2 | 8/2005 | Korthals |
| 7,197,873 B1 * | 4/2007 | Windhorst et al. ............ 60/487 |

OTHER PUBLICATIONS

Eaton, Hydrostatic Transaxles, Catalog 11-04-999, Aug. 1991.

* cited by examiner

ASSEMBLY FOR USE WITH A RETURN TO NEUTRAL MECHANISM

CROSS-REFERENCE

This application is a continuation of U.S. patent application Ser. No. 11/252,836, filed on Oct. 18, 2005, the contents of which are incorporated herein by reference.

BACKGROUND OF THE INVENTION

This invention relates generally to an axle driving apparatus and, more particularly, to an assembly used in connection with a return to neutral mechanism adapted to be mounted to the housing of a hydraulic drive apparatus such as an integrated hydrostatic transaxle ("IHT") or hydrostatic transmission ("HST"). The mechanism disclosed herein could also be used with hydraulic pumps or other types of hydrostatic transaxles.

The general design of IHTs and HSTs are known in the art and generally include a rotating hydraulic pump and a rotating hydraulic motor, carrying a plurality of reciprocating pistons which are in fluid communication through hydraulic porting. Rotation of the hydraulic pump against a moveable swash plate creates an axial motion of the pump pistons that forces an operating oil through the hydraulic porting to the hydraulic motor to move the motor pistons and cause rotation of the hydraulic motor to drive an output shaft or axle.

The swash plate position is adjustable to vary the speed and direction of rotation of the hydraulic motor and, accordingly, the speed and direction of the output rotation. For use in changing the position of the moveable swash plate, it is known to include a trunnion arm coupled to the swash plate. A speed change lever or a speed change pedal is, in turn, coupled to the trunnion arm through a wire or other driving link. In this manner, movement of the speed change lever/pedal results in movement of the trunnion arm to change the position of the swash plate to thereby control the speed and direction of the vehicle. An example of such a mechanism for adjusting the speed of a vehicle may be seen in commonly owned U.S. Pat. No. 6,122,996 which is incorporated herein by reference in its entirety.

For placing the swash plate in a position that neither affects the speed nor the direction of rotation of the hydraulic motor, i.e., the neutral position, a return to neutral mechanism is normally implemented as an integral part of the vehicle linkage. One known return to neutral mechanism is shown in commonly owned U.S. Pat. No. 6,782,797, the terms of which are incorporated herein by reference. Such a speed adjusting mechanism includes a return arm adapted to be mounted to casing in a fixed position indicative of a neutral position of the trunnion arm and a control arm that is mounted to and moves the trunnion arm. A pair of scissor return arms move the control arm in cooperation with the return arm for the purpose of moving the trunnion arm to the neutral position.

SUMMARY OF THE INVENTION

The invention disclosed herein comprises an assembly for use in connection with a return to neutral control mechanism for a transaxle or the like, whereby certain components of the mechanism may be preassembled, thereby increasing the ease of assembly of the entire unit and decreasing assembly costs.

A better understanding of the objects, advantages, features, properties and relationships of the invention will be obtained from the following detailed description and accompanying drawings which set forth an illustrative embodiment and which are indicative of the various ways in which the principles of the invention may be employed.

DETAILED DESCRIPTION OF THE DRAWINGS

Turning now to the figures, wherein like reference numerals refer to like elements, the present invention is depicted as used in connection with transaxle 10, which may be substantially identical to that described in commonly owned U.S. Pat. No. 6,152,247, which is incorporated herein by reference in its entirety. The details of transaxle 10 are not critical to this invention and will not be described in detail herein; this invention could also be used on other transaxle or transmission designs and this disclosure should not be read as limited to use with a zero-turn transaxle such as transaxle 10. The return to neutral design depicted herein is similar in many respects to that shown in U.S. Pat. No. 6,782,797; it will be understood that the assembly of the present invention may be used in connection with other designs and that this invention is not so limited. For further details on the operation of transaxle 10 or the return to neutral feature, the reader is referred to the patents referenced above.

The only element of the internal functioning of transaxle 10 that is key to this invention and thus depicted in the figures is trunnion 14, which extends from casing 11 and, it will be understood, is connected to a moveable swash plate (not shown) or similar structure. As will be understood by those of ordinary skill in the art, the swash plate may be moved to a variety of positions to vary the stroke of the pump pistons and the direction of rotation of the hydraulic motor. As the stroke of the pump pistons is varied, the volume of the hydraulic fluid pumped into the hydraulic porting of the center section will vary. Since the speed of rotation of the hydraulic motor is dependent upon the amount of hydraulic fluid pumped thereinto by the hydraulic pump and the direction of rotation of the hydraulic motor is dependent upon the direction of rotation of the hydraulic pump, the positioning of the swash plate is seen to control the speed and direction of rotation of the hydraulic motor and, accordingly, the speed and direction of rotation of an output or axle shaft.

To rotate trunnion arm 14 and, accordingly, move the swash plate assembly, a speed adjusting mechanism 316 is coupled to trunnion arm 14. Speed adjusting mechanism 316 may be connected, via a driving link, to a lever or pedal (not shown) provided on a vehicle (not shown) whereby movement of the lever or pedal is translated to the speed adjusting mechanism 316 to cause the rotation of trunnion arm 14 and movement of the swash plate assembly. Seal 30 is used to prevent leakage of hydraulic fluid from the opening in casing 11 from which trunnion arm 14 extends.

Figure 1:
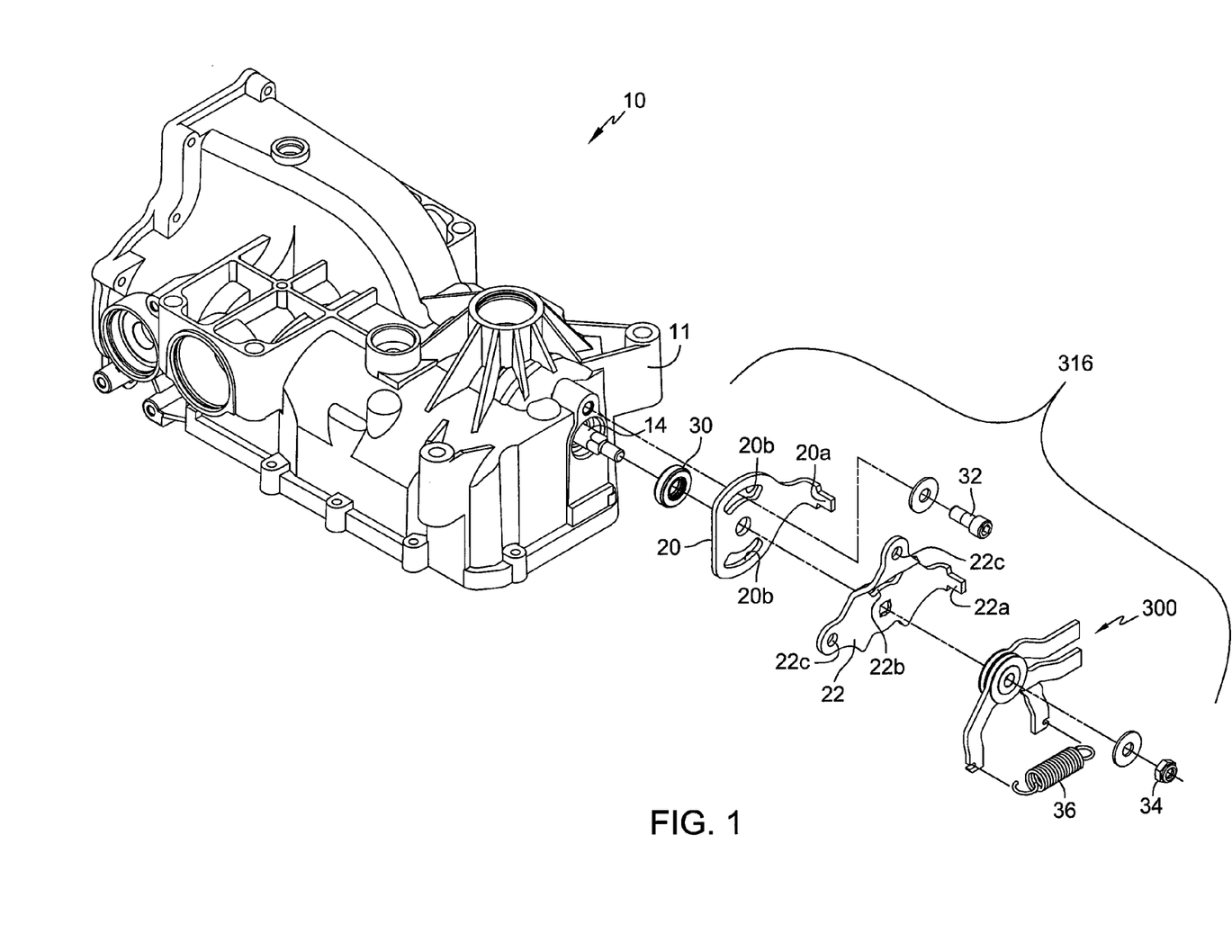
FIG. 1 is an exploded perspective view of an embodiment of a speed adjusting mechanism including a control assembly in accordance with the present invention.
Figure 2:
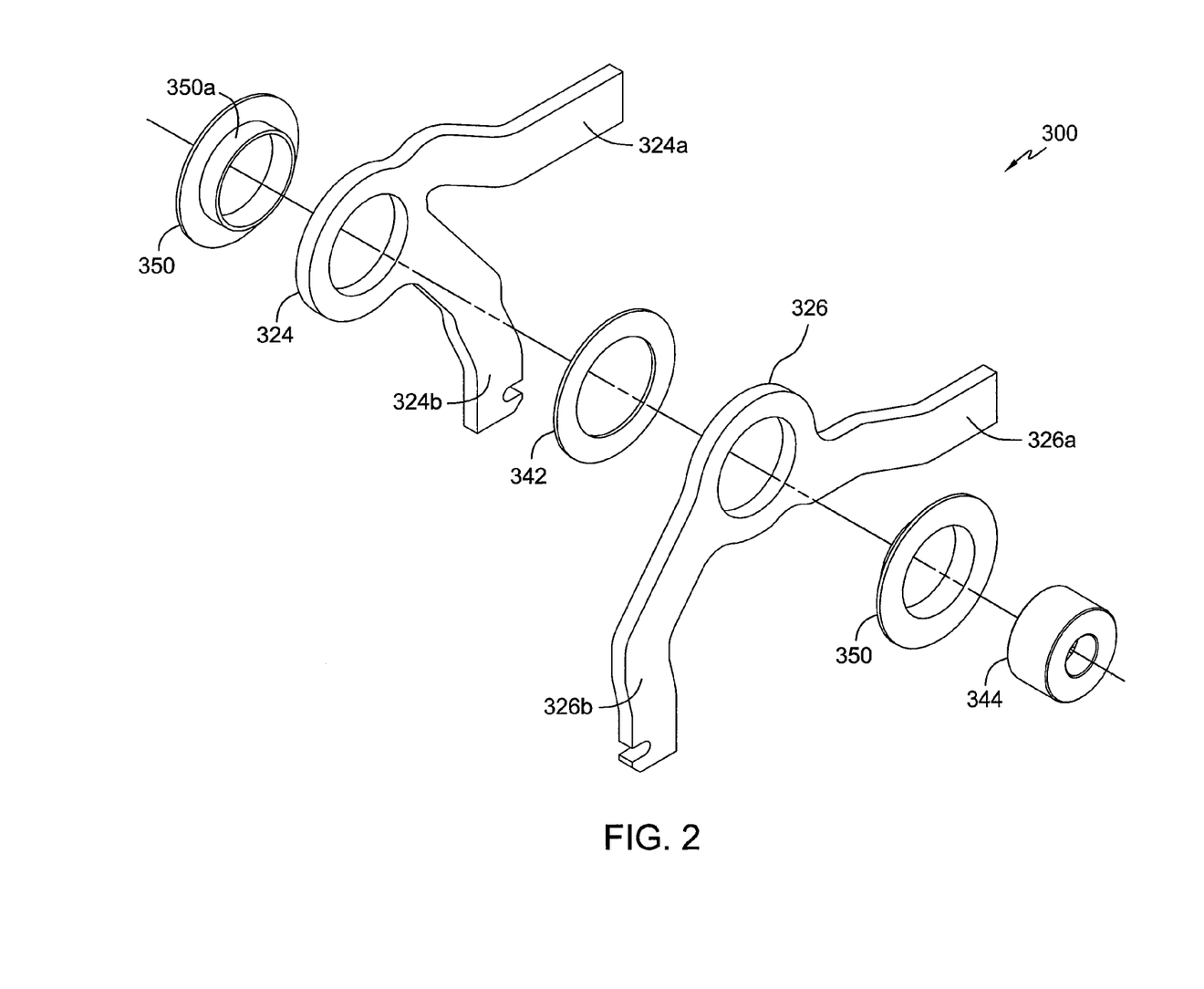
FIG. 2 is an exploded perspective view of a subassembly of the speed adjusting mechanism shown in FIG. 1.

As shown in FIGS. 1 and 2, speed adjusting mechanism 316 is comprised of a return arm 20, a control arm 22, an inner scissor return arm 324, and an outer scissor return arm 326. A nut 34, which would be mated with corresponding threads on the end of trunnion arm 14, retains speed adjusting mechanism 316 on trunnion arm 14. Speed adjusting mechanism 316 also functions to substantially establish the neutral position of trunnion arm 14, i.e., the position of trunnion arm 14 where the swash plate assembly does not influence the flow of hydraulic fluid within the hydraulic circuit, and to bias and move trunnion arm 14 towards this neutral position.

Control arm 22 is non-rotatably mounted to the end of trunnion arm 14, preferably by providing control arm 22 and trunnion arm 14 with complimentary mating shapes, so that rotation of control arm 22 will also result in rotation of trunnion arm 14. Control arm 22 includes openings 22c to which a driving link may be attached. A biasing means such as spring 36 is linked to inner and outer scissor return arms 324 and 326, and in particular, to arms 324b and 326b, respectively.

When trunnion arm 14 is placed in the position that corresponds to the neutral position of the swash plate, return arm 20 is attached to casing 11. For this purpose, an attachment device 32, such as a bolt/washer combination or the like, is inserted through an opening 20b and mated with casing 11 to trap return arm 20 between attachment device 32 and casing 11 and frictionally prevent return arm 20 from moving. At this time, under the influence of biasing means 36, projection 22a of control arm 22 and projection 20a of return arm 20 will be in alignment. This alignment of the projections 22a and 20a establishes the neutral position. In the neutral position, both inner scissor return arm 324 and outer scissor return arm 326 are in contact with projection 22a. Attachment device 32 also cooperates with opening 22b in control arm 22 to limit the range of motion of control arm 22.

When speed adjusting mechanism 316 is rotated in a first direction, projection 22a of control arm 22 will contact arm 324a of inner scissor return arm 324, resulting in the movement of inner scissor return arm 324. Meanwhile, arm 326a of outer scissor return arm 326 is prevented from moving as it remains in contact with projection 20a of return arm 20. When speed adjusting mechanism 316 is rotated in the opposite direction, projection 22a of control arm 22 will contact the arm 326a of outer scissor return arm 326, resulting in the movement of outer scissor return arm 326. Meanwhile, arm 324a of inner scissor return arm 324 is prevented from moving as it remains in contact with the projection 20a of return arm 20. In either case, once the force from the driving link is no longer applied to control arm 22, spring 36 will cause the scissor return arm that has been rotated to move towards the other scissor return arm that has been held in place, thus returning trunnion arm 14 to the neutral position.

Because such return to neutral mechanisms comprise a plurality of components, it is advantageous to preassemble a portion of the return to neutral mechanism in order to simplify assembly and reduce costs. Assembly 300 is shown in FIGS. 1 and 2 as part of speed adjusting mechanism 316. Assembly 300 is formed of inner arm 324, outer arm 326, spacer 344, a pair of bushings 350 and an optional washer 342. Bushings 350 are preferably identical, and each comprise a main flange and a generally tubular portion 350a that extends into an opening in the respective arms 324, 326. Spacer 344 is pressed into the tubular portions 350a of both bushings 350, and the components are retained in place by the frictional contact between the components. The advantage of this configuration will be obvious from the following discussion.

Figure 3:
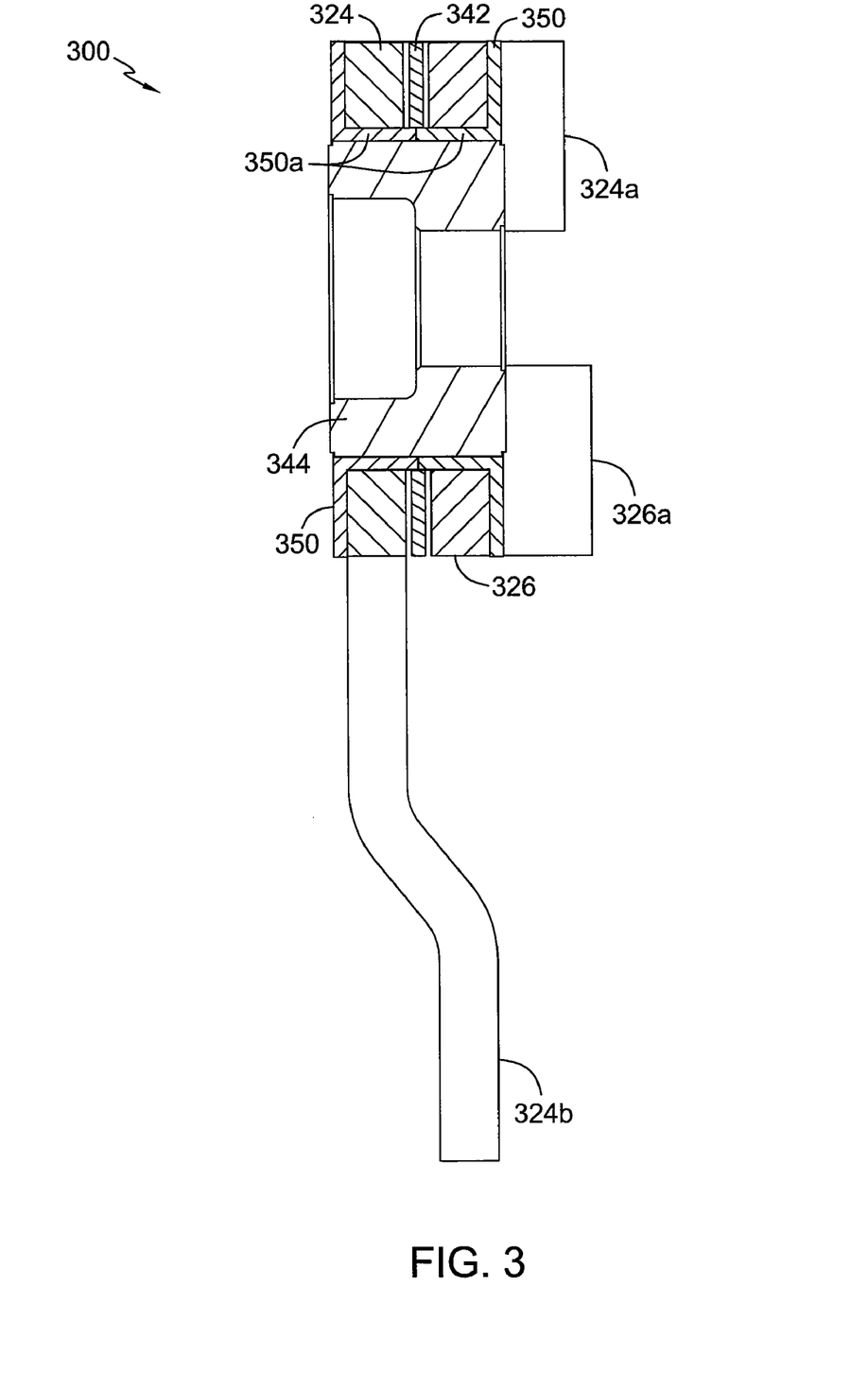
FIG. 3 is a cross-sectional view of the subassembly of the speed adjusting mechanism shown in FIGS. 1 and 2.

Assembly 300 is formed by capturing arm 324, washer 342, and arm 326 between the two bushings 350, as shown particularly in FIGS. 2 and 3, with the bushings 350 being located on opposite sides of the assembly. Spacer 344 is pressed into the two bushings 350 to hold the assembly together by the contact between these components. Thus, the contact between spacer 344 and the two bushings 350 serves to hold all of the components of assembly 300 together so that they may be attached to other elements of a transaxle as a single assembly. Once assembly 300 is formed, there is sufficient space between the two bushings 350 to encourage free rotational movement of inner arm 324 and outer arm 326 with respect to one another. The use of this separate subassembly greatly simplifies the assembly of the entire return to neutral assembly and the transaxle.

Figure 4:
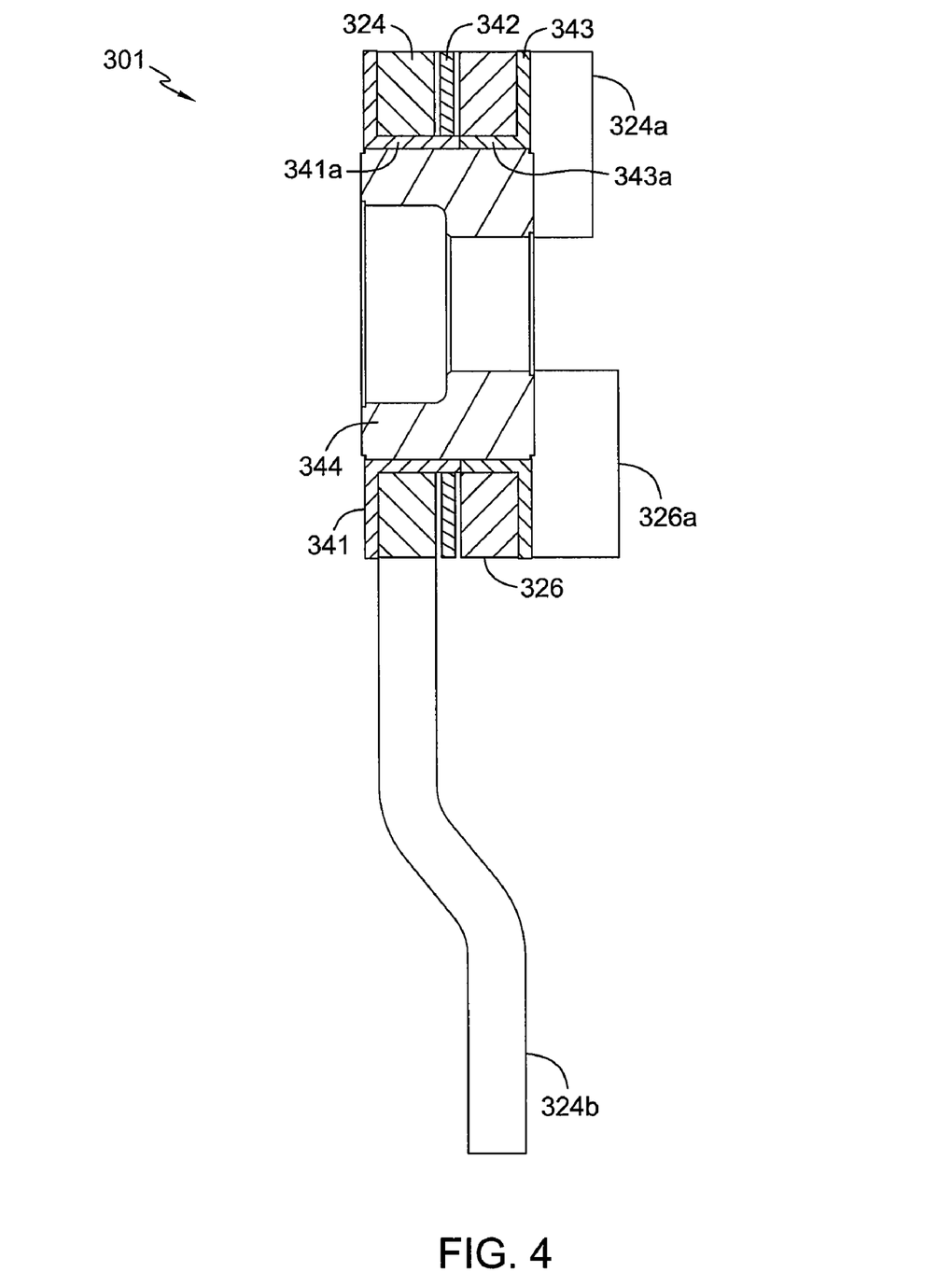
FIG. 4 is a cross-sectional view of an alternative embodiment of the subassembly of the speed adjusting mechanism.

In some circumstances it may be desirable to move the junction between the bushings away from washer 342. FIG. 4 shows an alternative embodiment, and in particular assembly 301 including bushings 341 and 343. The internal portion 341a of bushing 341 is slightly longer than internal portion 343a of bushing 343 so that the location where bushings 341 and 343 meet is not directly under washer 342. This configuration assists in keeping washer 342 in full contact with the periphery of internal portion 341a of bushing 341 rather than the junction of bushings 341 and 343.

Figure 5:
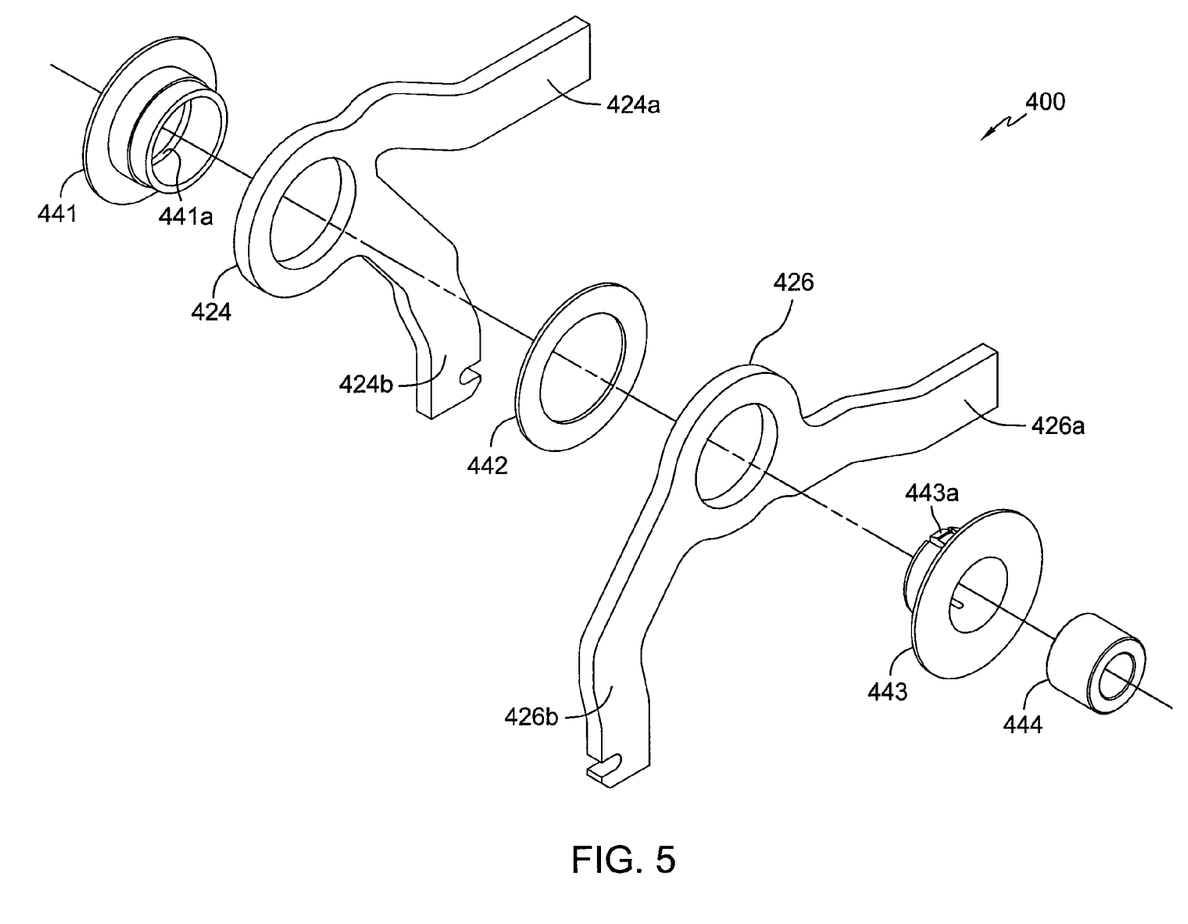
FIG. 5 is an exploded view of a further alternative embodiment of the subassembly of the speed adjusting mechanism.
Figure 6:
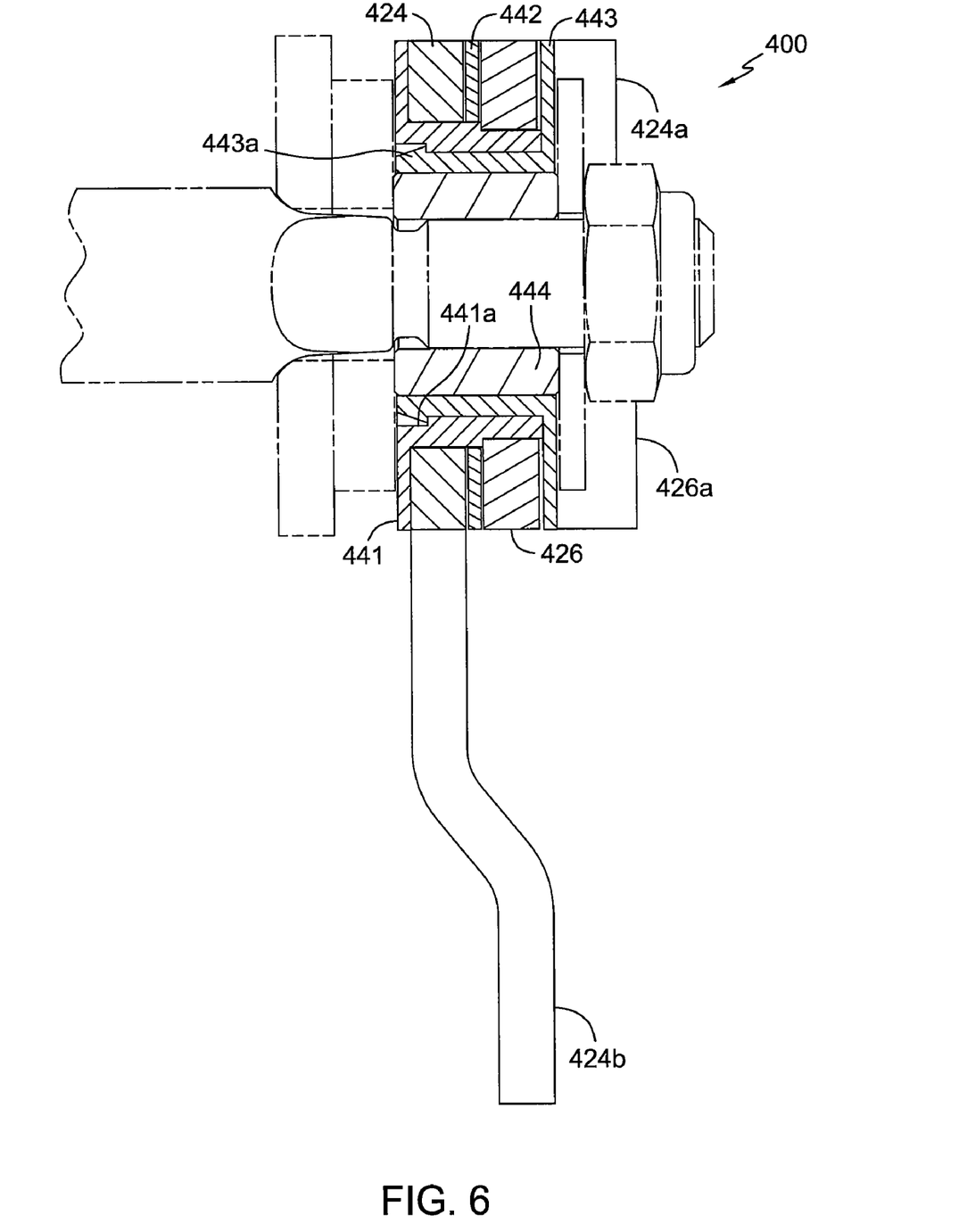
FIG. 6 is a cross-sectional view of the subassembly of the speed adjusting mechanism shown in FIG. 5, shown with other control elements.

FIGS. 5 and 6 show yet another embodiment in the form of assembly 400, which is similar in many respects to assembly 300 and assembly 301. However, bushing 443 has a tab 443a that engages an interlocking feature, such as step area 441a, on bushing 441, so that bushings 441 and 443 are physically secured to one another, thus increasing the integrity of assembly 400 in comparison to assemblies 300 and 301. Spacer 444 in this configuration is also slightly different from previous spacers disclosed herein. However, spacer 444 serves a similar function to previously disclosed spacer embodiments.

While specific embodiments of the invention have been described in detail, it will be appreciated by those skilled in the art that various modifications and alternatives to those details could be developed in light of the overall teachings of the disclosure. Accordingly, the particular arrangement disclosed is meant to be illustrative only and not limiting as to the scope of the invention which is to be given the full breadth of the appended claims and any equivalents thereof.

The invention claimed is:

1. A control mechanism for use with a hydraulic apparatus having a housing and a trunnion extending from the housing, the control mechanism comprising:

a return arm rotatably mounted on the trunnion and attached to the housing, the return arm comprising a stop;

a control arm attached to the trunnion; and a neutral arm assembly for mounting on the trunnion so that a portion of the neutral arm assembly is positioned to contact the stop to place the hydraulic apparatus in a neutral condition, the neutral arm assembly comprising a first arm and a second arm capable of rotating with respect to one another along a common axis of rotation, and a retention member disposed in a first opening formed in the first arm and a second opening formed in the second arm to rotatably retain the pair of arms proximate to one another in an operative relationship prior to mounting the neutral arm assembly on the trunnion.

2. A control mechanism as set forth in claim 1, wherein the retention member further comprises:
   a first bushing located on one side of the neutral arm assembly wherein a portion of the first bushing extends into the first opening; and
   a second bushing located on the other side of the neutral arm assembly wherein a portion of the second bushing extends into the second opening.

3. The control mechanism of claim 1, wherein each arm comprises a first portion extending outwardly from the first or second opening and a second portion extending outwardly from the first or second opening and angularly separated from the first portion.

4. A control mechanism for mounting externally to a hydraulic drive apparatus, the control mechanism comprising:
   a first arm comprising a first opening;
   a second arm comprising a second opening; and
   a retention member engaged to both the first and second arms to retain the first and second arms in an assembly, whereby the first and second arms are maintained in an operative relationship and can rotate with respect to one another in the assembly prior to mounting the assembly on the hydraulic drive apparatus.

5. A control mechanism as set forth in claim 4, wherein the retention member further comprises a first bushing having a portion thereof extending into the first opening and a second bushing having a portion thereof extending into the second opening.

6. A control mechanism for a hydraulic drive apparatus, the control mechanism comprising:
   a first arm comprising a first opening;
   a second arm comprising a second opening;
   a first bushing engaged to the first arm through the first opening; and
   a second bushing engaged to the second arm through the second opening and interlocking with the first bushing to retain the first and second arms and the first and second bushings into an assembly, wherein the first and second arms are rotatable with respect to one another.

7. The control mechanism of claim 6, wherein the first bushing and the second bushing are generally identical.

8. The control mechanism of claim 6, wherein each arm comprises a first portion extending outwardly from the first or second opening and a second portion extending outwardly from the first or second opening and angularly separated from the first portion.

9. The control mechanism of claim 6, further comprising a spacer engaged to an interior portion of at least one of the first bushing and the second bushing.

10. The control mechanism of claim 9, wherein the first arm comprises a first portion extending outwardly from the first opening and a second portion extending outwardly from the first opening and angularly separated from the first portion.

11. The control mechanism of claim 10, wherein the second arm comprises a first portion extending outwardly from the second opening and a second portion extending outwardly from the second opening and angularly separated from the first portion.

12. The control mechanism of claim 11, wherein at least one of the first portion and the second portion on the first arm and at least one of the first portion and the second portion on the second arm comprises an attachment location for a spring.

* * * * *